US012676350B2

(12) United States Patent
Yu et al.

(10) Patent No.: US 12,676,350 B2
(45) Date of Patent: Jul. 7, 2026

(54) METHOD FOR RECYCLING LITHIUM BATTERY CATHODE MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 484 days.

(21) Appl. No.: 18/212,697

(22) Filed: Jun. 21, 2023

(65) Prior Publication Data

US 2023/0335817 A1 Oct. 19, 2023

Related U.S. Application Data

(63) Continuation of application No. PCT/CN2022/092455, filed on May 12, 2022.

(30) Foreign Application Priority Data

Aug. 17, 2021 (CN) .......................... 202110944649.9

(51) Int. Cl.
| | |
|---|---|
| *C22B 26/12* | (2006.01) |
| *C22B 7/00* | (2006.01) |
| *H01M 10/54* | (2006.01) |

(52) U.S. Cl.
CPC ............. *H01M 10/54* (2013.01); *C22B 7/008* (2013.01); *C22B 26/12* (2013.01)

(58) Field of Classification Search
None
See application file for complete search history.

(56) References Cited

FOREIGN PATENT DOCUMENTS

JP 2021119464 * 8/2021

* cited by examiner

*Primary Examiner* — Sheng H Davis
(74) *Attorney, Agent, or Firm* — Westbridge IP LLC

(57) ABSTRACT

A method for recycling a lithium battery cathode material. Residual aluminum on the positive electrode sheet is dissolved by a sodium hydroxide solution, and lithium in the cathode material enters the solution during the dissolution of aluminum, such that an ionic potential is vacated on the cathode material; a residue is washed to avoid sodium ion contamination, then dried, and allowed to react with metallic lithium and lithium sulfide under heating, such that crystal lattices of the material change; a product after first-stage lithium supplementation is directly sintered with a lithium source in an oxygen atmosphere to obtain monocrystalline ternary cathode material agglomerates, where a sintering method and a sintering temperature are controlled; and the agglomerates are crushed, then washed to remove residual lithium on the surface, and dried to obtain a monocrystalline ternary cathode material, which has the performance close to that of the initially synthesized monocrystalline cathode material.

12 Claims, 2 Drawing Sheets

METHOD FOR RECYCLING LITHIUM BATTERY CATHODE MATERIAL

CROSS-REFERENCE TO RELATED APPLICATIONS

The present application is a continuation application of PCT application No. PCT/CN2022/092455 filed on May 12, 2022, which claims the benefit of Chinese Patent Application No. 202110944649.9 filed on Aug. 17, 2021. The contents of all of the aforementioned applications are incorporated by reference herein in their entirety.

TECHNICAL FIELD

The present invention belongs to the technical field of lithium battery recycling, and specifically relates to a method for recycling a lithium battery cathode material.

BACKGROUND

The ternary cathode material has become one of the most important cathode materials for lithium-ion batteries (LIBs) due to its high capacity and high-cost performance and is widely used in portable electronic devices such as mobile phones, mobile power supplies, and notebooks. Moreover, with the continuous development of the new energy automobile industry, the market demand for LIBs is increasing. After nearly 30 years of development, the production and assembly technologies of various components in LIB and the use and maintenance technologies of LIB are quite mature. With the increasing use of LIBs, the quantity of scrapped LIBs has also increased. In a scrapped LIB, the current collector and the active material layer have the largest comprehensive proportion and the highest economic value, and thus recovery thereof is very important.

A positive electrode active material of ternary LIB is mainly $LiNi_xCO_yMn_zO_2$ (where x+y+z=1). A positive electrode of LIB is fabricated as follows: thoroughly mixing a positive electrode active material (lithium transition metal oxide (LTMO)), a small amount of a conductive additive (generally acetylene black), and an organic binder, and coating a resulting mixture uniformly on an aluminum foil current collector to form the positive electrode. During a cycling process of a battery, the efflorescence of secondary particles, the continuous voltage drop, and the structural degradation from a lamellar phase to a spinel phase will lead to short cycling life, low thermal stability, dissolution of transition metals, and side reactions such as an interface reaction between a material and an electrolyte, and these problems will lead to a series of macro battery failure behaviors such as rapid capacity attenuation of the material, increased internal resistance, electrolyte consumption, thickened interfacial film, and decreased safety performance, which will shorten a cycling life of the material.

Industrially, the main recycling methods for waste ternary LIB include the fire process and wet process at present. The firing process achieves the recycling of a battery material through heat treatment, which is relatively simple, but has a low recovery rate and is easy to cause environmental pollution. The wet process achieves the recycling of a battery material through low-temperature leaching, purification, and separation, which is complicated.

Therefore, it is very necessary to provide a direct regeneration method of ternary cathode material to solve the above technical problems.

SUMMARY OF THE INVENTION

The present invention is intended to solve at least one of the technical problems existing in the prior art. Because of this, the present invention provides a method for recycling a lithium battery cathode material. In the method, a positive electrode sheet is subjected to impurity removal, lithium removal, and two-stage lithium supplementation sintering to obtain a monocrystalline ternary cathode material, which has a performance close to that of the initially synthesized cathode material.

According to one aspect of the present invention, a method for recycling a lithium battery cathode material is provided, comprising the following steps:

S1: subjecting a positive electrode sheet of a waste ternary lithium battery to selective leaching in a sodium hydroxide solution, performing solid-liquid separation (SLS) to obtain a leaching liquor and a leaching residue, and washing and drying the leaching residue to obtain a dried leaching residue;

S2: mixing the dried leaching residue with reductive lithium, and heating a resulting mixture in an inert atmosphere to obtain a first-stage lithium-supplemented material; and S3: mixing the first-stage lithium-supplemented material with a lithium source, subjecting a resulting mixture to calcination in an oxygen atmosphere to obtain a second-stage lithium-supplemented material, and crushing, washing, drying, and sieving the second-stage lithium-supplemented material to obtain a regenerated monocrystalline cathode material;

wherein the reductive lithium is at least one selected from the group consisting of metallic lithium and lithium sulfide.

In some embodiments of the present invention, in S1, the drying is conducted at 80-120° C. for 5 h to 24 h.

In some embodiments of the present invention, before S1, the method further includes: disassembling the waste ternary lithium battery, collecting the positive electrode sheet, and soaking the positive electrode sheet in an organic solvent to obtain an impurity-removed positive electrode sheet. The organic solvent is used to remove residual electrolyte on the positive electrode sheet, which can also dissolve a binder, thereby removing the binder as well.

In some embodiments of the present invention, the organic solvent is at least one selected from the group consisting of N-methyl pyrrolidone, N,N-dimethylacetamide, propylene carbonate, 1,3-dioxolane, dimethyl carbonate, and ethyl methyl carbonate.

In some embodiments of the present invention, in S1, the sodium hydroxide solution has a concentration of 0.5-8.0 mol/L; and preferably, a solid-to-liquid ratio of the positive electrode sheet to the sodium hydroxide solution is 0.1-50 g/L.

In some preferred embodiments of the present invention, in S1, the leaching is conducted at 20-90° C.

In some embodiments of the present invention, in S1, the sodium carbonate is added to the leaching liquor, and then SLS is conducted to obtain lithium carbonate, which can be used as the lithium source in S3.

In some embodiments of the present invention, in S2, a mass ratio of the dried leaching residue to the reductive lithium is 100:(0.01-0.5).

In some embodiments of the present invention, in S2, the inert gas is at least one selected from the group consisting of nitrogen, helium, and argon.

In some embodiments of the present invention, in S2, the heating is conducted at 200-600° C.; and preferably, the heating is conducted for 0.5-8 h.

In some embodiments of the present invention, in S3, the lithium source may be at least one selected from the group consisting of lithium hydroxide and lithium carbonate.

In some embodiments of the present invention, in S3, in the mixture of the first-stage lithium-supplemented material and the lithium source, a ratio of a total molar mass of nickel, cobalt, and manganese to a molar mass of lithium is 1:(1.05-1.10).

In some embodiments of the present invention, in S3, the calcination comprises: calcinating first at 400-700° C. for 4-12 h and then at 700-900° C. for 5-40 h.

In some embodiments of the present invention, in S3, the washing is conducted for 5-60 min.

In some embodiments of the present invention, in S3, the drying is conducted at 80-120° C., and further, the drying is conducted for 5-24 h.

According to a preferred implementation of the present invention, the present invention at least has the following beneficial effects:

1. The present invention prepares a monocrystalline ternary cathode material by subjecting a positive electrode sheet to alkali leaching for lithium removal and two-stage lithium supplementation sintering. In the method, residual aluminum on the positive electrode sheet is dissolved by a sodium hydroxide solution, and lithium in the cathode material enters the solution during the dissolution of aluminum, such that an ionic potential is vacated on the cathode material; a residue is washed to avoid sodium ion contamination, then dried, and allowed to react with metallic lithium and lithium sulfide under heating, such that crystal lattices of the material change; a product after first-stage lithium supplementation is directly sintered with a lithium source in an oxygen atmosphere (second-stage lithium supplementation) to obtain monocrystalline ternary cathode material agglomerates, where a sintering method and a sintering temperature are controlled; and the agglomerates are crushed, then washed to remove residual lithium on the surface, and dried to obtain a monocrystalline ternary cathode material.

2. The present invention prepares a monocrystalline cathode material through sintering. Through the sintering, cracked particles in the waste cathode material are re-smelted and crystallized with a lithium source to obtain a monocrystalline cathode material with performance close to that of the initially synthesized cathode material. The method can avoid many problems such as environmental pollution and complicated process caused by the wet and fire methods of recycling a battery cathode material.

BRIEF DESCRIPTION OF THE DRAWINGS

The present invention is further described below with reference to accompanying drawings and examples.

DETAILED DESCRIPTION

The concepts and technical effects of the present invention are clearly and completely described below in conjunction with examples, so as to allow the objectives, features and effects of the present invention to be fully understood. Apparently, the described examples are merely some rather than all of the examples of the present invention. All other examples obtained by those skilled in the art based on the examples of the present invention without creative efforts should fall within the protection scope of the present invention.

Example 1

Figure 1:
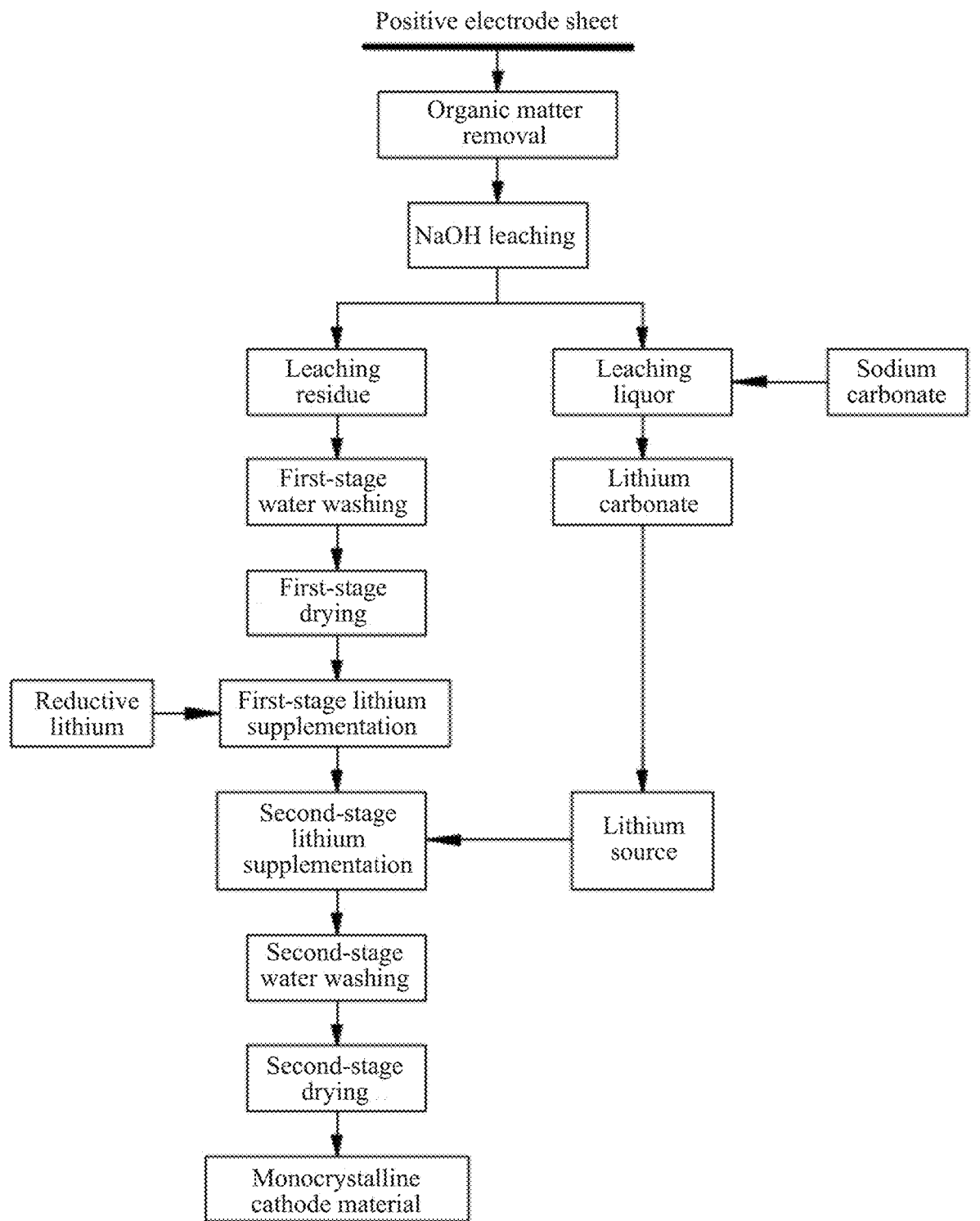
FIG. 1 is a schematic diagram illustrating a process flow of Example 1 of the present invention.

A method for recycling a waste NCM622 cathode material was provided, and as shown in FIG. 1, a specific process was as follows:

(1) Organic matter removal: A waste ternary lithium battery was disassembled, and a positive electrode sheet was taken out and soaked in NMP to remove the electrolyte and binder remaining on the positive electrode sheet.

(2) NaOH leaching: According to a solid-to-liquid ratio of 10 g/L, the soaked positive electrode sheet was subjected to selective leaching at 90° C. in a 1.0 mol/L sodium hydroxide solution, and after residual aluminum foil was completely dissolved, SLS was conducted to obtain a leaching liquor and a leaching residue; and sodium carbonate was added to the leaching liquor, and then SLS was conducted to obtain lithium carbonate, which could be used as a lithium source for second-stage lithium supplementation.

(3) First-stage water washing: The leaching residue was washed with pure water.

(4) First-stage drying: The water-washed leaching residue was dried at 110° C. for 24 h.

(5) First-stage lithium supplementation: After the dried leaching residue was thoroughly mixed with lithium sulfide in a mass ratio of 100:0.1, and a resulting mixture was heated at 600° C. for 5 h in a nitrogen atmosphere.

(6) Second-stage lithium supplementation: After the first-stage lithium supplementation was completed, according to a ratio of a total molar mass of nickel, cobalt, and manganese to a molar mass of lithium of 1:1.08, lithium carbonate was added, and a resulting mixture was sintered first at 700° C. for 5 h in an oxygen atmosphere and then at 900° C. for 5 h.

(7) Second-stage water washing: A sintered material was crushed and then washed with pure water for 5 min.

(8) Second-stage drying: After the second-stage water washing was completed, a resulting material was dried at 120° C. for 24 h, sieved, and then subjected to iron removal with an iron remover to obtain the NCM622 monocrystalline cathode material.

Figure 2:
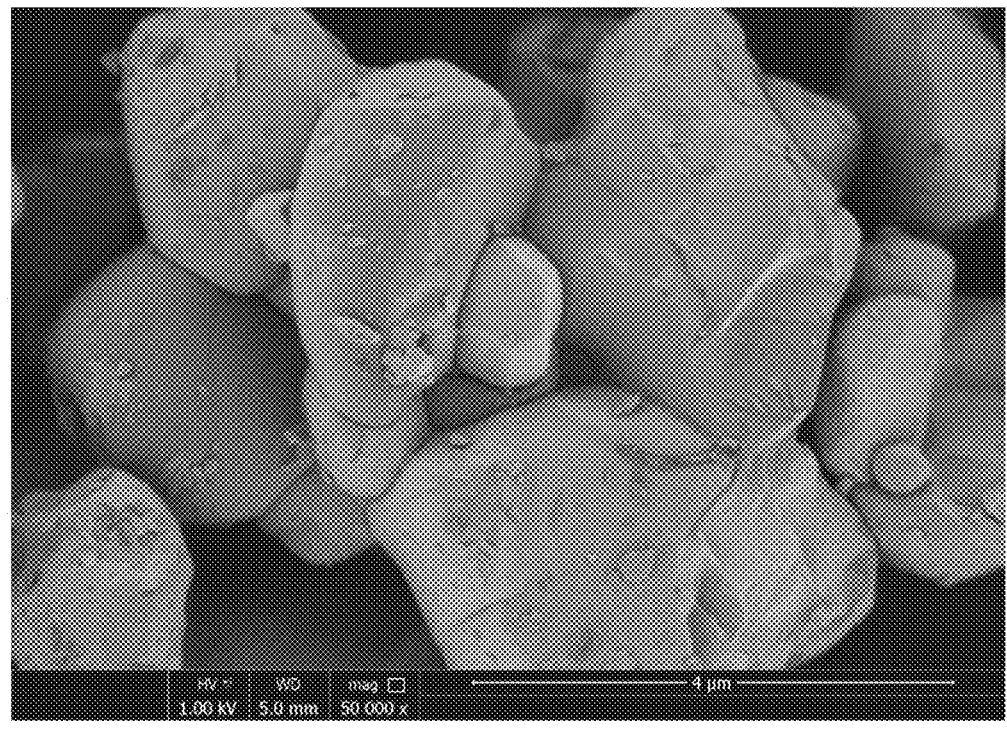
FIG. 2 is a scanning electron microscopy (SEM) image of the monocrystalline cathode material prepared in Example 1 of the present invention at a magnification of 50,000.
Figure 3:
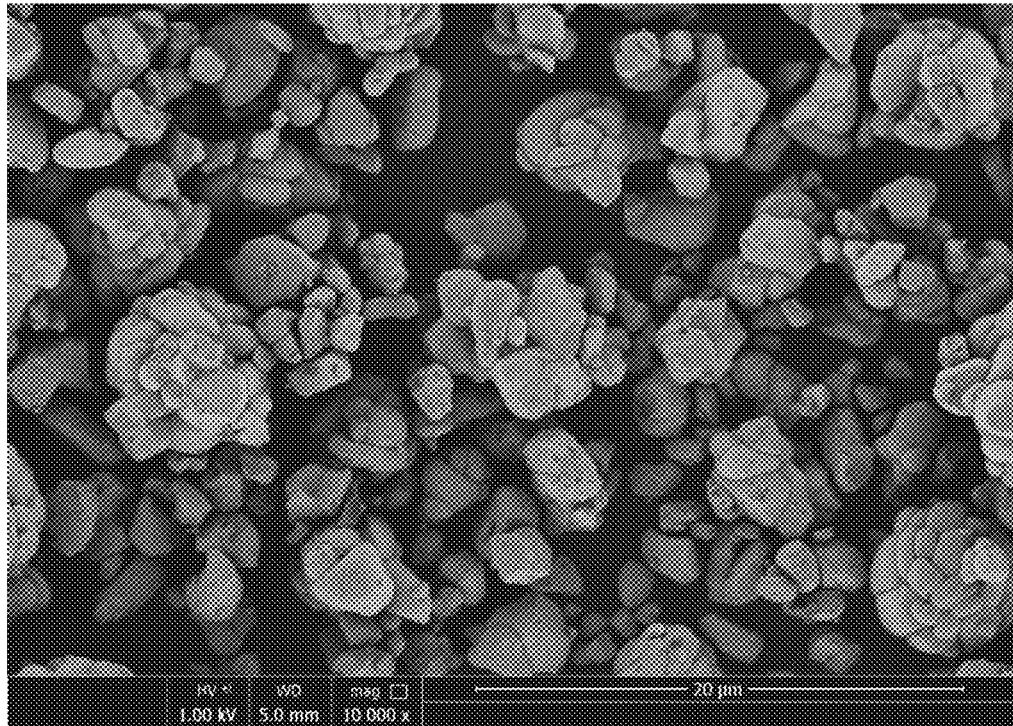
FIG. 3 is an SEM image of the monocrystalline cathode material prepared in Example 1 of the present invention at a magnification of 10,000.

FIG. 2 and FIG. 3 are SEM images of the monocrystalline cathode material prepared in this example at magnifications of 50,000 and 10,000, respectively, and it can be seen from the figures that the monocrystalline particle surface is relatively smooth and has little micropowder and damage.

Table 1 shows the electrochemical performance comparison of the monocrystalline cathode material prepared in this example and the initially synthesized NCM622 monocrystalline cathode material. The electrochemical performance was tested at a voltage range of 3 V to 4.4 V.

TABLE 1

| | Initial specific discharge capacity at 0.8 C (mAh/g) | Retention after 100 cycles at 0.8 C (%) |
|---|---|---|
| Example 1 | 173.5 | 95.3 |
| Initially synthesized NCM622 | 175.2 | 96.7 |

It can be seen from Table 1 that the performance of the cathode material regenerated in Example 1 is close to that of the initially synthesized NCM622 monocrystalline cathode material.

Example 2

A method for recycling a waste NCM523 cathode material was provided, and a specific process was as follows:

(1) Organic matter removal: A waste ternary lithium battery was disassembled, and a positive electrode sheet was taken out and soaked in a mixture of NMP and EMC to remove the electrolyte and binder remaining on the positive electrode sheet.

(2) NaOH leaching: According to a solid-to-liquid ratio of 15 g/L, the soaked positive electrode sheet was subjected to selective leaching at 80° C. in a 2.0 mol/L sodium hydroxide solution, and after residual aluminum foil was completely dissolved, SLS was conducted to obtain a leaching liquor and a leaching residue; and sodium carbonate was added to the leaching liquor, and then SLS was conducted to obtain lithium carbonate, which could be used as a lithium source for second-stage lithium supplementation.

(3) First-stage water washing: The leaching residue was washed with pure water.

(4) First-stage drying: The water-washed leaching residue was dried at 120° C. for 20 h.

(5) First-stage lithium supplementation: After the dried leaching residue was thoroughly mixed with metallic lithium in a mass ratio of 100:0.05, and a resulting mixture was heated at 200° C. for 3 h in a nitrogen atmosphere.

(6) Second-stage lithium supplementation: After the first-stage lithium supplementation was completed, according to a ratio of a total molar mass of nickel, cobalt, and manganese to a molar mass of lithium of 1:1.05, lithium carbonate was added, and a resulting mixture was sintered first at 500° C. for 5 h in an oxygen atmosphere and then at 800° C. for 10 h.

(7) Second-stage water washing: A sintered material was crushed and then washed with pure water for 10 min.

(8) Second-stage drying: After the second-stage water washing was completed, a resulting material was dried at 120° C. for 20 h, sieved, and then subjected to iron removal with an iron remover to obtain the NCM523 monocrystalline cathode material.

Table 2 shows the electrochemical performance comparison of the monocrystalline cathode material prepared in this example and the initially synthesized NCM523 monocrystalline cathode material. The electrochemical performance was tested at a voltage range of 3 V to 4.4 V.

TABLE 2

| | Initial specific discharge capacity at 0.5 C (mAh/g) | Retention after 300 cycles at 0.5 C (%) |
|---|---|---|
| Example 2 | 163.9 | 96.7 |
| Initially synthesized NCM523 | 165.6 | 98.0 |

It can be seen from Table 2 that the performance of the cathode material regenerated in Example 2 is close to that of the initially synthesized NCM523 monocrystalline cathode material.

Example 3

A method for recycling a waste NCM811 cathode material was provided, and a specific process was as follows:

(1) Organic matter removal: A waste ternary lithium battery was disassembled, and a positive electrode sheet was taken out and soaked in a mixture of DMAC and NMP to remove the electrolyte and binder remaining on the positive electrode sheet.

(2) NaOH leaching: According to a solid-to-liquid ratio of 20 g/L, the soaked positive electrode sheet was subjected to selective leaching at 70° C. in a 3.0 mol/L sodium hydroxide solution, and after residual aluminum foil was completely dissolved, SLS was conducted to obtain a leaching liquor and a leaching residue; and sodium carbonate was added to the leaching liquor, and then SLS was conducted to obtain lithium carbonate, which could be used as a lithium source for second-stage lithium supplementation.

(3) First-stage water washing: The leaching residue was washed with pure water.

(4) First-stage drying: The water-washed leaching residue was dried at 120° C. for 24 h.

(5) First-stage lithium supplementation: After the dried leaching residue was thoroughly mixed with lithium sulfide in a mass ratio of 100:0.2, and a resulting mixture was heated at 500° C. for 8 h in a nitrogen atmosphere.

(6) Second-stage lithium supplementation: After the first-stage lithium supplementation was completed, according to a ratio of a total molar mass of nickel, cobalt, and manganese to a molar mass of lithium of 1:1.10, lithium hydroxide was added, and a resulting mixture was sintered first at 500° C. for 4 h in an oxygen atmosphere and then at 850° C. for 9 h.

(7) Second-stage water washing: A sintered material was crushed and then washed with pure water for 20 min.

(8) Second-stage drying: After the second-stage water washing was completed, a resulting material was dried at 120° C. for 24 h, sieved, and then subjected to iron removal with an iron remover to obtain the NCM811 monocrystalline cathode material.

The examples of present invention are described in detail with reference to the accompanying drawings, but the present invention is not limited to the above examples. Within the scope of knowledge possessed by those of ordinary skill in the technical field, various changes can also be made without departing from the purpose of the present invention. In addition, the examples in the present invention or features in the examples may be combined with each other in a non-conflicting situation.

The invention claimed is:

1. A method for recycling a lithium battery cathode material, comprising the following steps:

S1: subjecting a positive electrode sheet of a waste ternary lithium battery to selective leaching in a sodium hydroxide solution, performing a first solid-liquid separation to obtain a leaching liquor and a leaching residue, and washing and drying the leaching residue to obtain a dried leaching residue;

S2: mixing the dried leaching residue with reductive lithium, and heating a resulting mixture in an inert atmosphere to obtain a first-stage lithium-supplemented material; and S3: mixing the first-stage lithium-supplemented material with a lithium source, subjecting a resulting mixture to calcination in an oxygen atmosphere to obtain a second-stage lithium-supplemented material, and crushing, washing, drying, and sieving the second-stage lithium-supplemented material to obtain a regenerated monocrystalline cathode material;

wherein the reductive lithium is at least one selected from the group consisting of metallic lithium and lithium sulfide.

2. The method according to claim 1, wherein before S1, the method further comprises: disassembling the waste ternary lithium battery, collecting the positive electrode sheet, and soaking the positive electrode sheet in an organic solvent to obtain an impurity-removed positive electrode sheet.

3. The method according to claim 2, wherein the organic solvent is at least one selected from the group consisting of N-methylpyrrolidone, N,N-dimethylacetamide, propylene carbonate, 1,3-dioxolane, dimethyl carbonate, and ethyl methyl carbonate.

4. The method according to claim 1, wherein in S1, the sodium hydroxide solution has a concentration of 0.5-8.0 mol/L.

5. The method according to claim 4, wherein in S1, a solid-to-liquid ratio of the positive electrode sheet to the sodium hydroxide solution is 0.1-50 g/L.

6. The method according to claim 1, wherein in S1, sodium carbonate is added to the leaching liquor, and then a second solid-liquid separation is conducted to obtain lithium carbonate, the lithium carbonate can be used as the lithium source in S3.

7. The method according to claim 1, wherein in S2, a mass ratio of the dried leaching residue to the reductive lithium is 100:(0.01-0.5).

8. The method according to claim 1, wherein in S2, the heating is conducted at 200-600° C.

9. The method according to claim 8, wherein in S2, the heating is conducted for 0.5-8 h.

10. The method according to claim 1, wherein in S3, the lithium source is at least one selected from the group consisting of lithium hydroxide and lithium carbonate.

11. The method according to claim 1, wherein in S3, in the mixture of the first-stage lithium-supplemented material and the lithium source, a ratio of a total molar mass of nickel, cobalt, and manganese to a molar mass of lithium is 1:(1.05-1.10).

12. The method according to claim 1, wherein in S3, the calcination comprises: calcinating first at 400-700° C. for 4-12 h and then at 700-900° C. for 5-40 h.

* * * * *